United States Patent
Guo et al.

(10) Patent No.: US 8,351,660 B2
(45) Date of Patent: Jan. 8, 2013

(54) APPARATUS AND METHOD FOR DETECTING SPECIFIC OBJECT PATTERN FROM IMAGE

(75) Inventors: Muling Guo, Kawasaki (JP); Satoshi Yashiro, Yokohama (JP); Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 895 days.

(21) Appl. No.: 12/395,067

(22) Filed: Feb. 27, 2009

(65) Prior Publication Data

US 2009/0226093 A1    Sep. 10, 2009

(30) Foreign Application Priority Data

Mar. 3, 2008  (JP) .................... 2008-052105

(51) Int. Cl.
*G06K 9/00* (2006.01)
(52) U.S. Cl. .................. 382/118; 117/209; 117/216
(58) Field of Classification Search .............. None
See application file for complete search history.

(56) References Cited

U.S. PATENT DOCUMENTS

| | | | | |
|---|---|---|---|---|
| 7,593,633 B2 * | 9/2009 | Okamoto | ........................ | 396/222 |
| 2005/0147278 A1 * | 7/2005 | Rui et al. | ....................... | 382/103 |
| 2006/0012702 A1 * | 1/2006 | Kawahara et al. | ............ | 348/345 |
| 2006/0198554 A1 * | 9/2006 | Porter et al. | ................... | 382/159 |
| 2007/0189752 A1 * | 8/2007 | Kobayashi | ..................... | 396/157 |
| 2008/0013873 A1 * | 1/2008 | Ishii et al. | ....................... | 384/448 |
| 2008/0219517 A1 * | 9/2008 | Blonk et al. | ................... | 382/118 |
| 2008/0309788 A1 * | 12/2008 | Onozawa | ................... | 348/222.1 |
| 2009/0041297 A1 * | 2/2009 | Zhang et al. | ................... | 382/103 |
| 2009/0190002 A1 * | 7/2009 | Tamura | .................... | 348/231.99 |
| 2009/0263022 A1 * | 10/2009 | Petrescu et al. | ............... | 382/195 |

OTHER PUBLICATIONS

M.H. Yang, D.J. Kriegman and N. Ahuja "Detecting Faces in Images: A Survey" IEEE Trans. on PAMI, vol. 24, No. 1, pp. 34-58, Jan. 2002.
P. Viola and M. Jones "Robust Real-time Object Detection" in Proc. of IEEE Workshop SCTV, Jul. 2001.

* cited by examiner

*Primary Examiner* — Jason M Repko
*Assistant Examiner* — David Perlman
(74) *Attorney, Agent, or Firm* — Canon USA Inc IP Division

(57) ABSTRACT

A face area is detected from an image captured by an image pickup device, pixel values of the image are adjusted based on information concerning the detected face area, a person area is detected from the adjusted image, and the detected face area is integrated with the detected person area. With this configuration, it is possible to accurately detect an object even in a case, for example, where the brightness is varied.

8 Claims, 8 Drawing Sheets

FIG. 5
DETECTION OF FACES
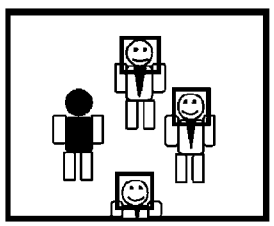
(a)
DETECTION OF PERSONS
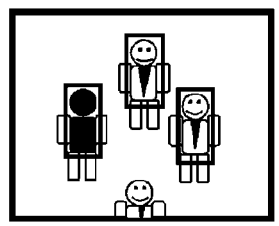
(b)
EXCLUDE PARTS DUPLICATING WITH RESULT OF FACE DETECTING UNIT
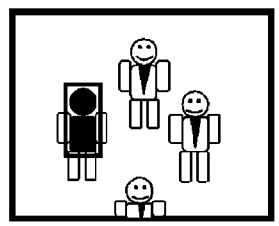
(c)
INTEGRATE DETECTION RESULTS TO DETERMINE SUBJECT AREA
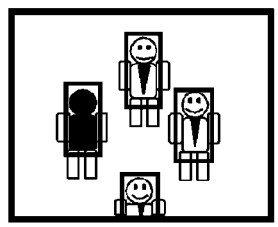
(d)
ENTERING PERSON
EXITING PERSON

APPARATUS AND METHOD FOR DETECTING SPECIFIC OBJECT PATTERN FROM IMAGE

BACKGROUND OF THE INVENTION

1. Field of the Invention

The present invention relates to an image processing apparatus and method for detecting a specific object pattern from an image.

2. Description of the Related Art

Image processing methods for automatically detecting specific object patterns from images are very useful and are used in, for example, determination of the faces of persons. Such methods are available in many fields including communication meetings, man-machine interfaces, security, monitor systems for tracing the faces of persons, and image compression. Various technologies for detecting faces from images are described in M.h. Yang, D. J. Kriegman, and N. Ahuja "Detecting Faces In Images: A Survey" IEEE Trans. On PAMI, Vol. 24, No. 1, pp. 34-58, January, 2002. In particular, an AdaBoost-based method described in P. Viola and M. Jones "Robust Real-time Object Detection" in Proc. of IEEE Workshop SCTV, July, 2001 is widely used in research on face detection because of its high execution speed and detection ratio.

FIG. 8 illustrates an example of a face detector in related art. As illustrated in FIG. 8, the face detector proposed by Viola et al. has a cascade structure in which multiple face identifiers are arranged. The face identifier in each stage determines whether an input image represents a face or non-face, and only the image determined to represent a face proceeds to the next stage. The image reaching the final stage is finally determined to represent a face.

FIG. 9 illustrates exemplary features identified by an identifier in the related art. As illustrated in FIG. 9, in each stage of a cascade structure, many features each belonging to any of four simple features are combined to compose the identifier. Each of the four features corresponds to the difference between the sum of gray-scale values in white rectangles and the sum of gray-scale values in black rectangles. A function for comparing this difference with a threshold value to output "1" or "0" is called weak hypothesis. Several thousands to several tens of thousands of pieces of learning data are used to configure the weak hypothesis. In the learning, one hundred and thirty thousands or more features are generated depending on how the positions and sizes of the rectangles are determined in an image of 24×24 pixels. The AdaBoost algorithm is used to select any of the features.

Although the face detector proposed by Viola, et al. can accurately detect front faces in various illumination conditions because of the enormous amount of learning data, faces subjected to out-of-plane rotations often fail to be detected. In contrast, application of the face detector proposed by Viola, et al. to the upper bodies of persons allows the face detector to function as a person detector that is capable of detecting the objects. However, there are cases where the objects cannot be detected because of the various illumination conditions that are varied.

SUMMARY OF THE INVENTION

The present invention provides an image processing apparatus and method that are capable of accurately detecting an object even in a case, for example, where the brightness is varied.

According to an embodiment of the present invention, an image processing apparatus includes a face-area detecting unit configured to detect a face area from an image captured by an image pickup unit; an adjusting unit configured to adjust pixel values of the image based on information concerning the detected face area; a person-area detecting unit configured to detect a person area from the adjusted image; and an integrating unit configured to integrate the detected face area with the detected person area.

According to another embodiment of the present invention, an image processing method includes detecting a face area from an image captured by an image pickup device; adjusting pixel values of the image based on information concerning the detected face area; detecting a person area from the adjusted image; and integrating the detected face area with the detected person area.

Further features of the present invention will become apparent from the following description of exemplary embodiments with reference to the attached drawings.

BRIEF DESCRIPTION OF THE DRAWINGS

FIG. 5 illustrates an example of integration of detection results.

DESCRIPTION OF THE EMBODIMENTS

Embodiments of the present invention will herein be described in detail with reference to the attached drawings.

Figure 1:
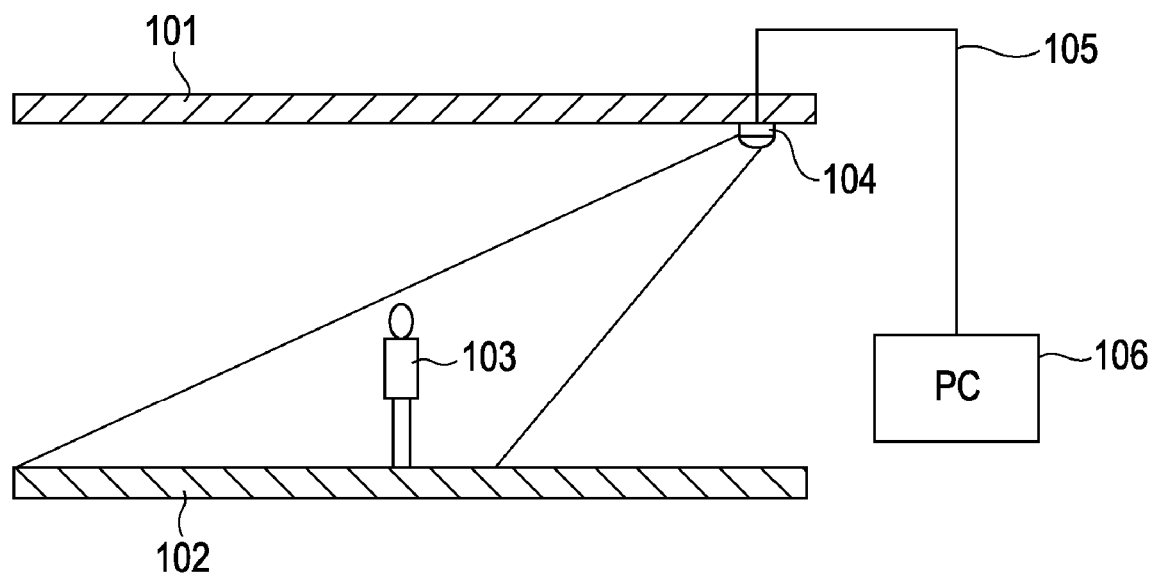
FIG. 1 illustrates an example of the configuration of a system.

FIG. 1 illustrates an example of the configuration of a system according to an embodiment of the present invention. Referring to FIG. 1, a person 103 is passing through a passage having a ceiling 101 and a floor 102. An image capturing unit (camera) 104 is mounted on the ceiling 101 so that an image of the person 103 can be captured at an angle from above. A cable 105 is, for example, a local area network (LAN) cable or a coaxial cable. An image captured by the image capturing unit 104 is transmitted to a personal computer (PC) 106, which is an image processing apparatus or a computer, through the cable 105. The PC 106 analyzes the captured image to detect an object.

Figure 2:
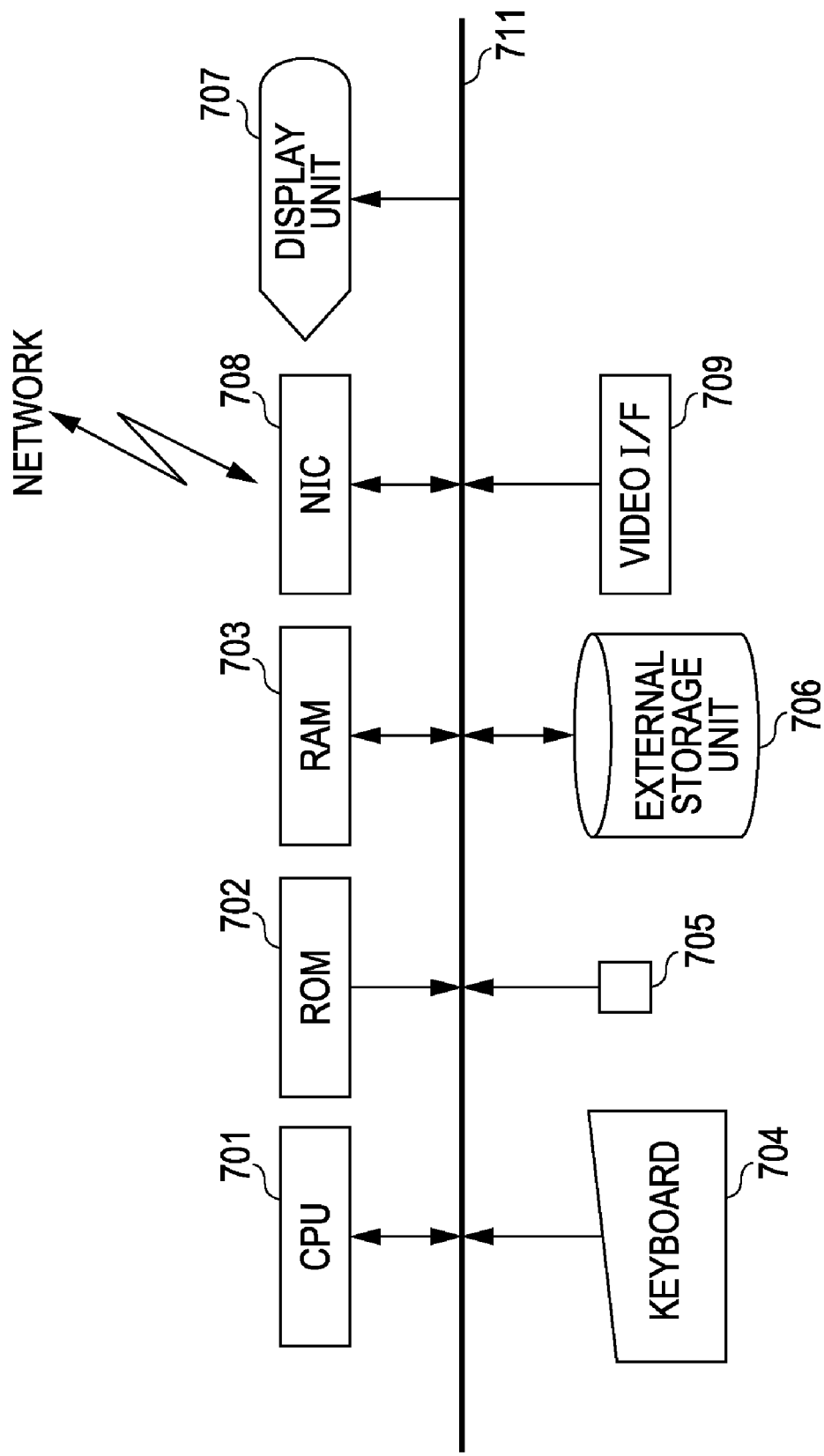
FIG. 2 is a block diagram illustrating an example of the hardware configuration of a PC.

FIG. 2 is a block diagram illustrating an example of the hardware configuration of the PC 106. Referring to FIG. 2, a central processing unit (CPU) 701 performs various controls in the PC 106. A read only memory (ROM) 702 stores a boot program and a variety of data executed at startup of the PC 106. A random access memory (RAM) 703 stores control programs executed by the CPU 701 and provides a working area used when the CPU 701 performs the various controls. A keyboard 704 and a mouse 705 provide various environments for input operations by a user.

An external storage unit 706 is, for example, a hard disk, an optical disk, a magnetic disk, a magneto-optical disk, or a magnetic tape. However, the external storage unit 706 is not necessarily provided if all of the control programs and the variety of data are held in the ROM 702. A display unit 707 is, for example, a display device and displays processing results, etc. for the user. The PC 106 is capable of communicating with the image capturing unit 104 on a network via a network interface card (NIC) 708 and, for example, the LAN cable. The PC 106 is capable of acquiring a frame image captured by the image capturing unit 104 via the coaxial cable and a video interface (video I/F) 709. The above components are connected to each other via a bus 711.

Figure 3:
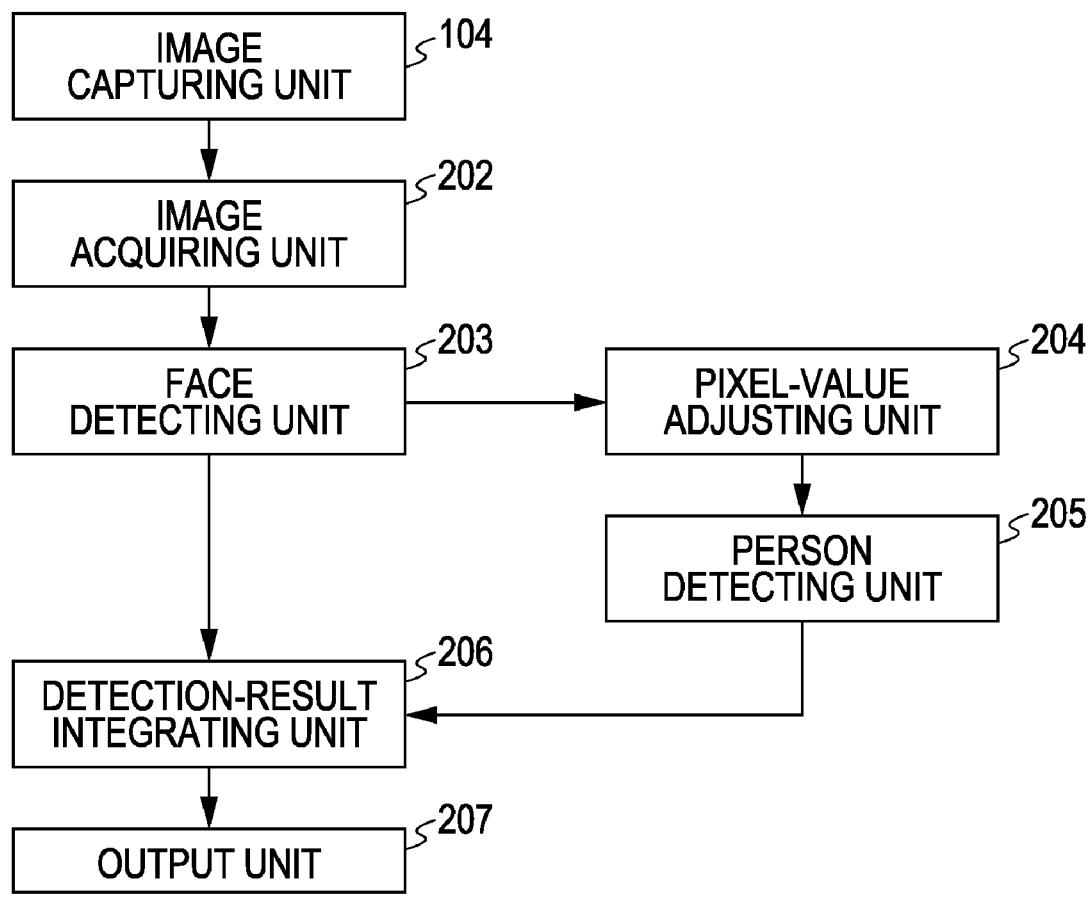
FIG. 3 is a block diagram illustrating an example of the functional configuration of the system.

FIG. 3 is a block diagram illustrating an example of the functional configuration of the system according to the present embodiment. Referring to FIG. 3, the image capturing unit 104 captures an image. An image acquiring unit 202 acquires the frame image from the image capturing unit 104. When the cable 105 is a LAN cable, the frame image is transmitted from the image capturing unit 104 through the cable 105 as packet data according to an http protocol and is acquired by the system through the NIC 708 in the PC 106. In contrast, when the cable 105 is a coaxial cable, the frame image is acquired from the image capturing unit 104 through the cable 105 and the video interface 709 in the PC 106.

A face detecting unit 203 analyzes the current frame image acquired by the image acquiring unit 202 to detect a face area.

A pixel-value adjusting unit 204 calculates an average luminance of all the face areas detected by the face detecting unit 203 and adjusts the pixel values of the entire current frame image so that the average luminance is converted into a predetermined luminance.

A person detecting unit 205 detects an object area (person area) from the current frame image adjusted by the pixel-value adjusting unit 204. The upper body of a person is detected as the object area (person area).

A detection-result integrating unit 206 integrates the face area detected by the face detecting unit 203 with the object area detected by the person detecting unit 205.

An output unit 207 outputs information about the object resulting from the integration in the detection-result integrating unit 206 to a memory (the RAM 703 or the external storage unit 706) or the display unit 707.

Figure 4:
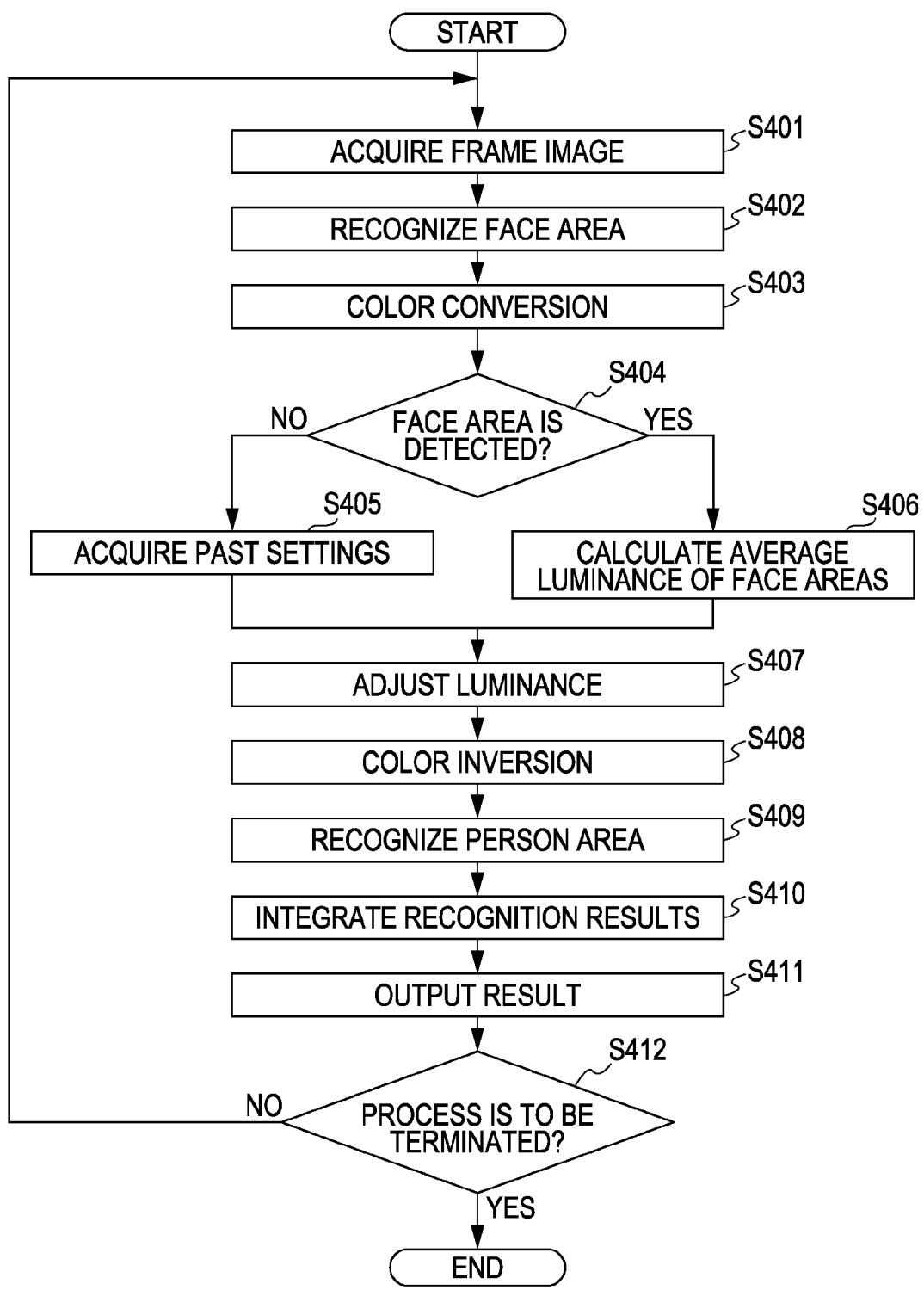
FIG. 4 is a flowchart illustrating an example of a process of detecting objects.

FIG. 4 is a flowchart illustrating an example of a process of detecting objects according to the first embodiment of the present invention.

In Step S401, the image acquiring unit 202 acquires a frame image from the image capturing unit 104.

In Step S402, the face detecting unit 203 performs face recognition on the frame image acquired in Step S401 to detect all the face areas (detection of face areas). The face detecting unit 203 can focus attention on a specific area, which is a face, to stably detect the object in the smaller area even in various illumination conditions, compared with the case in which the person detecting unit 205 is used.

In Step S403, the pixel-value adjusting unit 204 performs YCbCr image conversion to an RGB frame image I acquired in Step S401 according to Equations (1) to (3):

$$Y=0.299R+0.587G+0.114B \tag{1}$$

$$Cb=-0.172R-0.339G+0.511B \tag{2}$$

$$Cr=0.511R-0.428G-0.083B \tag{3}$$

In Step S404, the pixel-value adjusting unit 204 checks the result of the face detection in Step S402. If no face area is detected, the process goes to Step S405. If a face area is detected, the process goes to Step S406.

In Step S405, the pixel-value adjusting unit 204 calculates an average luminance of the face areas of the past frame images stored in the memory and sets the calculated average luminance as an average luminance m. A luminance c, which is an initial value, is originally stored in the memory and, if the average luminance is calculated in Step S406 described below, the calculated average luminance (the average luminance m) is also stored in the memory.

In Step S406, the pixel-value adjusting unit 204 uses the luminance image Y obtained in Step S403 to calculate an average luminance m of all the face areas detected in Step S402. The pixel-value adjusting unit 204 stores the average luminance m in the memory.

In Step S407, the pixel-value adjusting unit 204 adds a predetermined offset value to the entire luminance image Y on the basis of the average luminance m calculated in Step S405 or S406 according to Equation (4) so that the average luminance m of the face areas is adjusted to the predetermined luminance c:

$$Y'=Y+(c-m) \tag{4}$$

In Step S408, the pixel-value adjusting unit 204 combines the adjusted luminance image Y' with the color difference signals Cb and Cr according to Equations (5) to (7) to perform color inversion in order to obtain an RGB image I':

$$R'=Y'+1.371Cr \tag{5}$$

$$G'=Y'-0.336Cb-0.698Cr \tag{6}$$

$$B'=Y'+17.732Cb \tag{7}$$

In Step S409, the person detecting unit 205 uses the RGB image I' obtained in Step S408 to recognize the upper bodies of persons in order to detect person areas (detection of person areas). Since the person detecting unit 205 can detect a person who keeps his/her head down, turns his/her head away, or turns around, unlike the face detecting unit 203, the person detecting unit 205 is robust to the out-of-plane rotation of an object.

In Step S410, the detection-result integrating unit 206 integrates the face areas detected in Step S402 with the person areas detected in Step S409.

FIG. 5 illustrates an example of the integration of detection results. As illustrated in FIG. 5(a) or 5(b), images of four objects are captured by the pixel-value adjusting unit 204. Of the four objects, three objects are entering persons and one object is an exiting person.

FIG. 5(a) illustrates three entering persons detected by the face detecting unit 203. In this case, since the face of one exiting person is invisible, the face thereof cannot be detected by the face detecting unit 203. FIG. 5(b) illustrates two entering persons and one exiting person detected by the person detecting unit 205. In this case, since one entering person is exiting from the image capturing area, the person cannot be detected by the person detecting unit 205. FIG. 5(c) illustrates a result of exclusion of the two entering persons, which are duplications with the detection result of the objects detected by the face detecting unit 203, from the detection result of the objects detected by the person detecting unit 205. The one exiting person is left in the result in FIG. 5(c). The detection-result integrating unit 206 determines the object areas from the result in FIG. 5(c) and the detection result by the face detecting unit 203. FIG. 5(d) illustrates a result of integration of the face areas with the person areas by the detection-result integrating unit 206.

In Step S411, the output unit 207 outputs the object areas resulting from the integration in Step S410 to the memory or the display unit 707.

In Step S412, the image acquiring unit 202 determines whether the process is to be terminated on the basis of turning off of the power or an instruction of the user with the keyboard 704 or the mouse 705. If the image acquiring unit 202 determines that the process is to be terminated, the process illustrated in FIG. 4 is terminated. If the image acquiring unit 202 determines that the process is not to be terminated, the process goes back to Step S401.

The process according to the present embodiment of the present invention is also applicable to a still image captured by the image capturing unit 104, in addition to frame images that are continuous videos.

The face detecting unit 203 may detect face areas from each frame image (one image) extracted at predetermined time intervals or for every predetermined number of frames. In this case, the pixel-value adjusting unit 204 may calculate an average luminance (average luminance m) of all the face areas detected by the face detecting unit 203 and may adjust all the pixel values of the image so that the calculated average luminance m becomes equal to the predetermined value (luminance c). For example, if the illumination conditions are not varied for a certain time period, the above method can be adopted to increase the execution speed.

In addition, the face detecting unit 203 may detect face areas from each of the frame images corresponding to a predetermined time period or a predetermined number of frames extracted at predetermined time intervals or for every predetermined number of frames. In this case, the pixel-value adjusting unit 204 may calculate an average luminance (average luminance m) of all the face areas detected by the face detecting unit 203 and may adjust all the pixel values of the image so that the calculated average luminance m becomes equal to the predetermined value (luminance c). For example, the face detecting unit 203 may detect face areas from each of the frame images corresponding to five minutes for every thirty minutes.

The pixel-value adjusting unit 204 may adjust the pixel values of the entire image on the basis of a dynamic range, instead of the average luminance of the face areas. Provided that the dynamic range of the face areas is represented by $[a_0, a_1]$, the dynamic range of the face areas can be converted into a predetermined range $[c_0, c_1]$ according to Equation (8):

$$Y' = \frac{c_1 - c_0}{a_1 - a_0} \cdot (Y - a_0) + c_0 \qquad (8)$$

Although the pixel-value adjusting unit 204 adjusts the luminance of each pixel value in the present embodiment of the present invention, the pixel-value adjusting unit 204 may adjust the color temperature of the entire image on the basis of the detected face areas, in addition to the color conversion.

Figure 6:
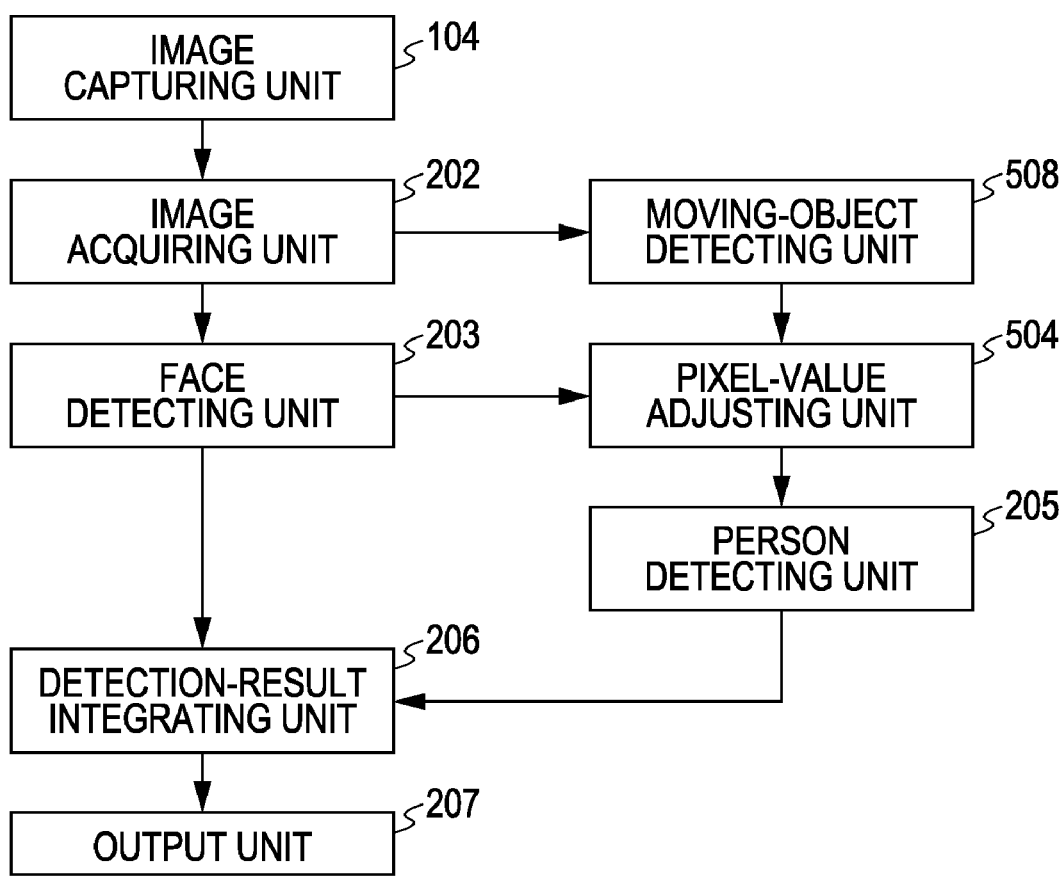
FIG. 6 is a block diagram illustrating another example of the functional configuration of a system.

FIG. 6 is a block diagram illustrating an example of the functional configuration of a system according to another embodiment of the present invention.

The functional configuration in the present embodiment differs from that in the previously described embodiment in that a moving-object detecting unit 508 is added to the PC 106. With this configuration, a pixel-value adjusting unit 504 in the system according to the present embodiment can adjust the pixel values only in moving object areas, which are part of the current frame image, instead of the entire current frame image.

The moving-object detecting unit 508 calculates the difference between the current frame image acquired by the image acquiring unit 202 and a background image and compares the difference with a threshold value to detect moving object areas.

The pixel-value adjusting unit 504 calculates an average luminance of all the face areas detected by the face detecting unit 203 and adjusts the pixel values of the moving object areas included in the current frame image so that the calculated average luminance is converted into a predetermined luminance. The pixel-value adjusting unit 504 leaves the pixel values of the background area other than the moving object areas intact.

Figure 7:
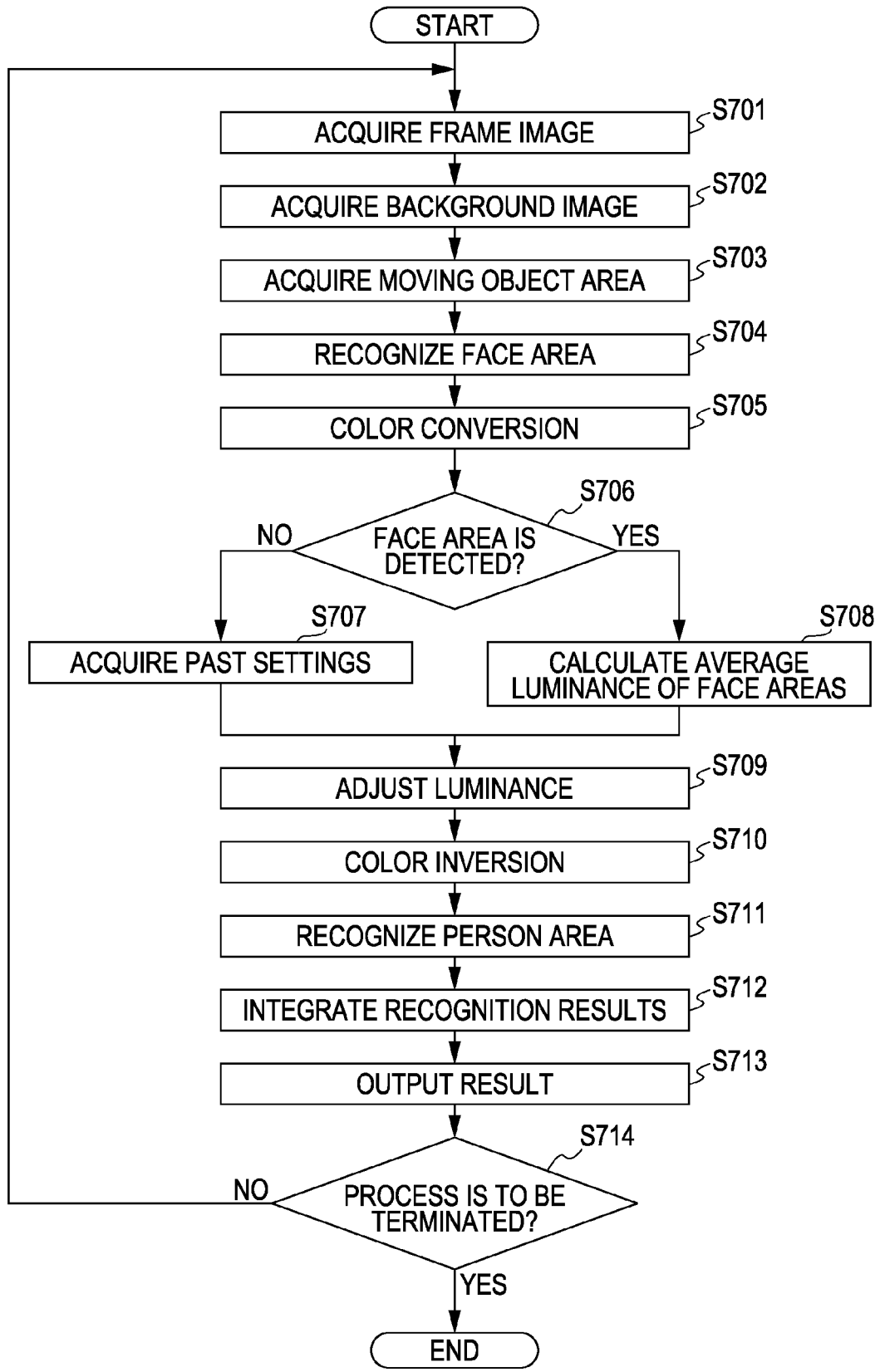
FIG. 7 is a flowchart illustrating an example of another process of detecting objects.
Figure 8:
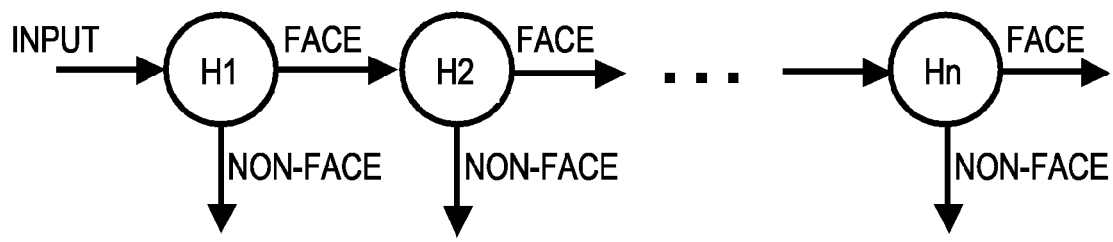
FIG. 8 illustrates an example of a face detector in related art.
Figure 9:
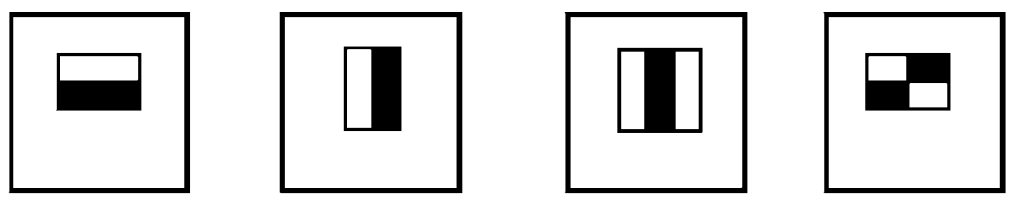
FIG. 9 illustrates exemplary features identified by an identifier in the related art.

FIG. 7 is a flowchart illustrating an example of a process of detecting objects according to the present embodiment of the present invention.

In Step S701, the image acquiring unit 202 acquires a frame image from the image capturing unit 104.

In Step S702, the moving-object detecting unit 508 acquires a background image used for detecting moving object areas. For example, the moving-object detecting unit 508 generates a cumulative histogram of the pixel values at each position from the images (video) corresponding to a predetermined time period or a predetermined number of frames, supplied from the image capturing unit 104, and sets each pixel value whose cumulative probability exceeds 0.5 as the background pixel value at the corresponding position. If the illumination conditions are gradually varied due to, for example, the weather, the background image may be updated at predetermined time intervals.

In Step S703, the moving-object detecting unit 508 calculates the difference between the current frame image and the background image acquired in Step S702 and compares the difference with a threshold value. The pixels whose differences are higher than the threshold value are determined to be the moving object pixels and the pixels whose differences are not higher than the threshold value are determined to be the background pixels.

In Step S704, the face detecting unit 203 performs face recognition to the frame image acquired in Step S701 to detect all the face areas (detection of face areas).

In Step S705, the pixel-value adjusting unit 504 performs YCbCr image conversion to the RGB frame image I acquired in Step S701 according to Equations (1) to (3) described above.

In Step S706, the pixel-value adjusting unit 504 checks the result of the face detection in Step S704. If no face area is detected, the process goes to Step S707. If a face area is detected, the process goes to Step S708.

In Step S707, the pixel-value adjusting unit 504 calculates an average luminance of the face areas of the past frame images stored in the memory and sets the calculated average luminance as an average luminance m. A luminance c, which is an initial value, is originally stored in the memory and, if the average luminance is calculated in Step S708 described below, the calculated average luminance (the average luminance m) is also stored in the memory.

In Step S708, the pixel-value adjusting unit 504 uses the luminance image Y obtained in Step S705 to calculate an average luminance m of all the face areas detected in Step S704. The pixel-value adjusting unit 504 stores the average luminance m in the memory.

In Step S709, the pixel-value adjusting unit 504 adds a predetermined offset value to the moving object areas of the luminance image Y on the basis of the average luminance m calculated in Step S707 or S708 according to Equation (4) described above so that the average luminance m of the face areas is adjusted to the predetermined luminance c. The pixel-value adjusting unit 504 leaves the background area intact.

In Step S710, the pixel-value adjusting unit 504 combines the adjusted luminance image Y' with the color difference signals Cb and Cr according to Equations (5) to (7) described above to perform color inversion in order to obtain an RGB image I'.

In Step S711, the person detecting unit 205 uses the RGB image I' obtained in Step S710 to recognize the upper bodies of persons in order to detect person areas (detection of person areas).

In Step S712, the detection-result integrating unit 206 integrates the face areas detected in Step S704 with the person areas detected in Step S711.

In Step S713, the output unit 207 outputs the object area resulting from the integration in Step S712 to the memory or the display unit 707.

In Step S714, the image acquiring unit 202 determines whether the process is to be terminated on the basis of turning off of the power or an instruction of the user with the keyboard 704 or the mouse 705. If the image acquiring unit 202 determines that the process is to be terminated, the process illustrated in FIG. 7 is terminated. If the image acquiring unit 202 determines that the process is not to be terminated, the process goes back to Step S701.

The process according to the present embodiment of the present invention is also applicable to a still image captured by the image capturing unit 104, in addition to frame images that are continuous videos.

The face detecting unit 203 may detect face areas from each frame image (one image) extracted at predetermined time intervals or for every predetermined number of frames. In this case, the pixel-value adjusting unit 504 may calculate an average luminance (average luminance m) of all the face areas detected by the face detecting unit 203 and may adjust the pixel values of the moving object areas in the image so that the calculated average luminance m becomes equal to the predetermined value (luminance c). For example, if the illumination conditions are not varied for a certain time period, the above method can be adopted to increase the execution speed.

In addition, the face detecting unit 203 may detect face areas from each of the frame images corresponding to a predetermined time period or a predetermined number of frames extracted at predetermined time intervals or for every predetermined number of frames. In this case, the pixel-value adjusting unit 504 may calculate an average luminance (average luminance m) of all the face areas detected by the face detecting unit 203 and may adjust the pixel values of the moving object areas in the image so that the calculated average luminance m becomes equal to the predetermined value (luminance c). For example, the face detecting unit 203 may detect face areas from each of the frame images corresponding to five minutes for every thirty minutes.

The pixel-value adjusting unit 504 may adjust the pixel values of the moving object areas in the image on the basis of the dynamic range, instead of the average luminance of the face areas. Provided that the dynamic range of the face areas is represented by $[a_0, a_1]$, the dynamic range of the face areas can be converted into a predetermined range $[c_0, c_1]$ according to Equation (8) described above.

Although the pixel-value adjusting unit 504 adjusts the luminance of each pixel value in the present embodiment of the present invention, the pixel-value adjusting unit 504 may adjust the color temperature of the moving object areas in the image on the basis of the detected face areas, in addition to the color conversion.

The present invention can be embodied by supplying a storage medium (or a recording medium) having program code (software) realizing the functions according to the above embodiments to a system or an apparatus, the CPU or the micro processing unit (MPU) in which system or apparatus reads out and executes the program code stored in the storage medium. In this case, the program code itself read out from the storage medium realizes the functions of the embodiments described above.

The CPU of the system or apparatus may execute the readout program code and the operating system (OS) or the like running on the system or apparatus may execute all or part of the actual processing based on instructions in the program code to realize the functions of the embodiments described above.

In the application of the present invention to the storage medium, the program code corresponding to the flowcharts described above is stored in the storage medium (the computer-readable storage medium).

According to the embodiments of the present invention described above, it is possible to automatically adjust the average luminance or the dynamic range of the entire image or part of the image by using the result of detection in a small area that is robust to various illumination conditions by the face detecting unit. Accordingly, the accuracy of the detection by the person detecting unit can be increased in the various illumination conditions, and the result of the detection by the face detecting unit can be integrated with that by the person detecting unit to accurately detect an object.

According to the embodiments of the present invention, it is possible to accurately detect an object even in a case, for example, where the brightness is varied.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-052105 filed Mar. 3, 2008, which is hereby incorporated by reference herein in its entirety.

What is claimed is:

1. An image processing apparatus comprising:
    a face-area detecting unit configured to detect a face area from a current frame in a sequence of frames captured by an image pickup unit;
    an adjusting unit configured to adjust pixel values of the current frame based on image information of the face area in the current frame if the face area has been detected from the current frame and adjusting pixel values the current frame based on image information of a face area detected from a past frame in the sequence of frames if the face area has not been detected from the current frame;
    a person-area detecting unit configured to detect a person area from the adjusted image of the current frame; and
    an integrating unit configured to integrate the detected face area with the detected person area.

2. The image processing apparatus according to claim 1, wherein the face-area detecting unit detects a face area from each frame extracted at predetermined time intervals or for every predetermined number of frames in the sequence of frames.

3. The image processing apparatus according to claim 2, wherein the adjusting unit calculates an average luminance or a dynamic range of all the face areas detected by the face-area detecting unit and adjusts all the pixel values or some pixel values of the image so that the average luminance or the dynamic range becomes equal to a predetermined value.

4. The image processing apparatus according to claim 1, wherein the face-area detecting unit detects a face area from each of the frames corresponding to a predetermined time period or a predetermined number of frames extracted at predetermined time intervals or for every predetermined number of frames in the sequence of frames.

5. The image processing apparatus according to claim 1, further comprising:
a moving-object-area detecting unit configured to detect a moving object area based on the face area detected by the face-area detecting unit and a background area,
wherein the adjusting unit adjusts the pixel values of the moving object area detected by the moving-object-area detecting unit based on information concerning the face area.

6. The image processing apparatus according to claim 1, further comprising:
an output unit configured to output a result of the integration by the integrating unit.

7. An image processing method comprising:
detecting a face area from a current frame in a sequence of frames captured by an image pickup device;
adjusting pixel values of the current frame based on image information of the face area in the current frame if the face area has been detected from the current frame and adjusting pixel values of the current frame based on image information of a face area detected from a past frame in the sequence of frames if the face area has not been detected from the current frame;
detecting a person area from the adjusted image of the current frame; and
integrating the detected face area with the detected person area.

8. A non-transitory computer-readable storage medium that stores a program for instructing a computer to implement the image processing method according to claim 7.

* * * * *